US012490226B2

(12) United States Patent
Jiang

(10) Patent No.: US 12,490,226 B2
(45) Date of Patent: Dec. 2, 2025

(54) METHODS FOR RESUMING CELL SERVICE, NON-TRANSITORY COMPUTER READABLE STORAGE MEDIA FOR PERFORMING THE SAME, AND TERMINALS CAPABLE OF RESUMING CELL SERVICE

(71) Applicant: Samsung Electronics Co., Ltd., Suwon-si (KR)

(72) Inventor: Weiqiang Jiang, Suzhou Industrial Park (CN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 389 days.

(21) Appl. No.: 17/881,212

(22) Filed: Aug. 4, 2022

(65) Prior Publication Data

US 2023/0422206 A1 Dec. 28, 2023

(30) Foreign Application Priority Data

Jun. 23, 2022 (CN) .......................... 202210718104.0

(51) Int. Cl.
*H04W 64/00* (2009.01)
*H04W 52/02* (2009.01)
*H04W 88/06* (2009.01)

(52) U.S. Cl.
CPC ..... *H04W 64/003* (2013.01); *H04W 52/0206* (2013.01); *H04W 88/06* (2013.01)

(58) Field of Classification Search
CPC .......... H04W 64/003; H04W 52/0206; H04W 88/06; H04W 52/0209; H04W 48/16; Y02D 30/70
See application file for complete search history.

(56) References Cited

U.S. PATENT DOCUMENTS 9,319,863 B2 4/2016 Peruru et al.
10,085,203 B2 9/2018 Xue et al.
(Continued)

FOREIGN PATENT DOCUMENTS

CN 105009661 A 10/2015
CN 106465236 A 2/2017
(Continued)

OTHER PUBLICATIONS

Chinese Office Action, dated Jun. 25, 2024, issued in Chinese Patent Application No. 202210718104.0.
(Continued)

*Primary Examiner* — Khawar Iqbal
(74) *Attorney, Agent, or Firm* — Harness, Dickey & Pierce, P.L.C.

(57) ABSTRACT

A method for resuming cell service including acquiring first geographic location information of a terminal and first time-frequency position information of a cell corresponding to the terminal entering an offline state, the terminal being located in a coverage area of the cell when the terminal enters the offline state, and the cell service being suspended in the offline state, initiating a timer corresponding to the terminal entering the offline state, acquiring second geographic location information of the terminal and stopping the timer corresponding to the terminal exiting the offline state, and resuming the cell service based on the first time-frequency position information and a timer duration based on a determination that the terminal has not left the cell, the timer duration being based on a value of the timer at the stopping, and the determination being based on the first geographic location information and the second geographic location information.

20 Claims, 8 Drawing Sheets

(56) References Cited

U.S. PATENT DOCUMENTS

| | | |
|---|---|---|
| 10,321,389 B2 | 6/2019 | Axmon et al. |
| 10,764,819 B2 | 9/2020 | Zhou et al. |
| 2018/0124868 A1 | 5/2018 | Gupta et al. |
| 2020/0304984 A1 | 9/2020 | Dhanapal et al. |
| 2021/0014934 A1 | 1/2021 | Lovlekar et al. |
| 2021/0321322 A1* | 10/2021 | Wang .................. H04W 48/20 |
| 2022/0117018 A1* | 4/2022 | Gu ........................ H04W 8/183 |
| 2022/0264462 A1* | 8/2022 | Bao .................... H04W 52/0274 |
| 2022/0312192 A1* | 9/2022 | Graybeal ............ H04L 61/5092 |
| 2023/0007640 A1* | 1/2023 | Kumar ................. H04W 72/56 |
| 2023/0254742 A1 | 8/2023 | Liu |
| 2023/0422206 A1* | 12/2023 | Jiang ................ H04W 52/0206 |
| 2024/0179582 A1* | 5/2024 | Li ......................... H04W 48/12 |
| 2024/0187979 A1* | 6/2024 | Korneluk .............. H04W 48/18 |
| 2024/0283607 A1* | 8/2024 | Ma ....................... H04L 5/0051 |
| 2024/0284484 A1* | 8/2024 | Zhang .................. H04L 1/0061 |
| 2024/0397297 A1* | 11/2024 | Li ......................... H04W 74/08 |
| 2024/0397403 A1* | 11/2024 | Xiong .................. H04W 76/19 |
| 2025/0016721 A1* | 1/2025 | Edge ..................... H04W 64/00 |
| 2025/0063529 A1* | 2/2025 | Li ...................... H04B 7/18513 |

FOREIGN PATENT DOCUMENTS

| | | |
|---|---|---|
| CN | 106921993 A | 7/2017 |
| CN | 111447659 A | 7/2020 |
| CN | 112040533 A | 12/2020 |
| CN | 112243278 A | 1/2021 |
| CN | 112566206 A | 3/2021 |
| CN | 113170384 A | 7/2021 |
| WO | 2014021762 A1 | 2/2014 |

OTHER PUBLICATIONS

Chinese Notice of Allowance, dated Dec. 17, 2024, issued in Chinese Patent Application No. 202210718104.0.

* cited by examiner

FIG. 2

2G time delay: 1036ms
11:10:42.774 11:12:24.419781 ST1 SIP UL.Request UL BYE
11:10:42.876 11:12:24.543713 ST1 SIP DL.Response DL 200 OK
11:10:42.926 11:12:24.595684 ST2 GMC TraceFunction MMC::RAT:MMC_HEDGE_MODE resume-start
11:10:43.987 11:12:25.631847 ST2 GRR_CELL_MNG TraceFlow PLMN selection complete

3G time delay: 1451ms
11:20:07.351 11:21:14.910865 ST1 SIP UL.Request UL BYE
11:20:07.500 11:21:15.049873 ST1 SIP DL.Response DL 200 OK
11:20:07.570 11:21:15.136054 ST2 GMC TraceFunction MMC::RAT:MMC_HEDGE_MODE resume-start
11:20:09.032 11:21:16.587959 ST2 URRC_CELLSEL TraceModule Selected new Serving Cell (10663,310)

4G time delay: 243ms
10:46:11.137 10:46:59.207502 ST1 SIP DL.Request DL BYE
10:46:11.137 10:46:59.211622 ST1 SIP UL.Response UL 200 OK
10:46:11.252 10:46:59.352461 ST2 LTE_RRM TraceFlow [RRM->L1LC] Send RRM_L1LC_RESUME_REQ
10:46:11.511 10:46:59.595930 ST2 LTE_RRM_DBG TraceFunction Camp-on success.

| TimerX starts | TimerX stops | TimerX un-expired |
|---|---|---|
| When a call of a SUB#1 starts, a SUB#2 enters a OOS state, enables the TimerX, and records the current first geographic location informa-tion. | When the SUB#1 ends the call and the TimerX is running, the TimerX stops, and the running duration of the TimerX and the current second geographic loca-tion informaion are recorded. | A duration of the TimerX is set to an infinite length. |

FIG. 9

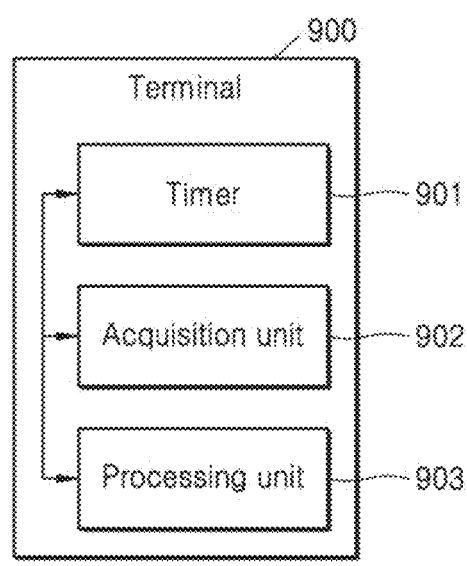

METHODS FOR RESUMING CELL SERVICE, NON-TRANSITORY COMPUTER READABLE STORAGE MEDIA FOR PERFORMING THE SAME, AND TERMINALS CAPABLE OF RESUMING CELL SERVICE

This application claims priority to Chinese Patent Application No. 202210718104.0 filed on Jun. 23, 2022, and all the benefits accruing therefrom under 35 U.S.C. § 119, the disclosure of which is incorporated herein by reference in its entirety.

TECHNICAL FIELD

The present disclosure generally relates to a method for resuming cell service and a terminal capable of resuming the cell service, and specifically relates to a method and a terminal using a timer to rapidly perform cell synchronization to resume the cell service.

BACKGROUND

Usually, due to the limitations of existing communication technologies, a case in which a mobile terminal suspends a cell service (e.g., a connection to a cellular communication network) due to difficulty in acquiring the cell service often occurs when the mobile terminal re-searches the network to acquire the cell service and to resume the cell service from a state of suspension of the cell service. For example, mobile terminals re-search the network, determine a resident cell based on the search result, and receive relevant information from the selected cell to re-acquire the cell service. This process is time-consuming, which is not conducive to energy saving, reduces performance parameters of the mobile terminal, and affects the user experience of the mobile terminal.

Specifically, the above scenario may be a scenario in which a mobile terminal with a dual-card dual-standby (e.g., a dual subscriber identity module (SIM) dual standby device) (DSDS) mode is used, because functions of the DSDS mode are implemented by a manufacturer of the mobile terminal, however, operations of the DSDS mode are not defined in the current $3^{rd}$ generation partnership project (3GPP) protocol. In FIG. 1, a case is shown in which a first subscriber identification module (SIM) card (SUB #1) is in (e.g., connected to) a call (e.g., a circuit switched (CS) call) and a second SIM card (SUB #2) is idle. When a user makes a call using the SUB #1 of a mobile terminal with a DSDS mode, the SUB #2 of the mobile terminal will suspend a network connection so as to enter and maintain an offline (e.g., out of service) (OOS) state. Although the SUB #2 is in an energy-saving OOS state during the call of SUB #1, when the SUB #1 ends the call, regardless of whether the mobile terminal is in a static mode with a different location or still resides in the cell where the SUB #1 started the call, the SUB #2 re-searches the network to synchronize information related to the cell service. Therefore, the existing technology has at least the following disadvantages: the SUB #2 searching the network will lead to excessive power consumption, the SUB #2 re-searching the cell will result in delayed restoration of the cell service, for example, in FIG. 1, the restoration of the cell service will generate a time delay Y. FIG. 2 shows values of the time delay Y for each radio access technology (RAT) when resuming the cell service in the case shown. For example, the time delay Y may be 1036 ms for a second-generation (2G) global system for mobile communications (GSM) network, 1451 ms for a third-generation (3G) GSM network, and/or 243 ms for a fourth-generation (4G) GSM network.

The above information is presented only as background technical information to aid in understanding the present disclosure.

SUMMARY

Embodiments of the inventive concepts provide a method and terminal for resuming cell service to at least address the above challenges and/or disadvantages, and to at least provide the advantages described below.

According to embodiments of the present disclosure, a method for resuming cell service may include first acquiring first geographic location information of a terminal and first time-frequency position information of a cell corresponding to the terminal entering an offline state, the terminal being located in a coverage area of the cell when the terminal enters the offline state, and the cell service being suspended in the offline state, initiating a timer corresponding to the terminal entering the offline state, second acquiring second geographic location information of the terminal and stopping the timer corresponding to the terminal exiting the offline state, and resuming the cell service based on the first time-frequency position information and a timer duration based on a determination that the terminal has not left the cell, the timer duration being based on a value of the timer at the stopping, and the determination being based on the first geographic location information and the second geographic location information.

In the method according to embodiments of the present disclosure, the resuming the cell service may include determining second time-frequency position information of the terminal based on the first time-frequency position information and the timer duration, and resuming the cell service based on the second time-frequency position information.

In the method according to embodiments of the present disclosure, the determination may include determining that the terminal has not left the cell based on a distance between a first geographic location and a second geographic location being less than or equal to a radius of the coverage area of the cell, the first geographic location being based on the first geographic location information, and the second geographic location being based on the second geographic location information.

In the method according to embodiments of the present disclosure, the terminal includes a first subscriber identification module (SIM) card and a second SIM card, the entering the offline state includes causing the second SIM card to enter the offline state in response to the first SIM card entering a call state, the first acquiring first acquires the first geographic location information and the first time-frequency position information in response to the first SIM card entering the call state, the exiting the offline state includes causing the second SIM card to exit the offline state in response to the first SIM card ending the call state, and the resuming the cell service resumes the cell service in response to the first SIM card ending the call state.

In the method according to embodiments of the present disclosure, the method may also include storing synchronization information corresponding to the terminal entering the offline state, wherein the resuming the cell service resumes the cell service by, receiving the synchronization information at a time-frequency position determined according to the second time-frequency position information, and resuming the cell service using the synchronization information.

In the method according to embodiments of the present disclosure, the synchronization information may include frequency-point information, time-slot synchronization information and system broadcast information of the cell.

According to embodiments of the present disclosure, a terminal capable of resuming cell service may include processing circuitry configured to acquire first geographic location information of the terminal and first time-frequency position information of a cell corresponding to the terminal entering an offline state, the terminal being located in a coverage area of the cell when the terminal enters the offline state, and the cell service being suspended in the offline state, initiating a timer to corresponding to the terminal entering the offline state, acquire second geographic location information of the terminal and stop the timer corresponding to the terminal exiting the offline state, and resume the cell service based on the first time-frequency position information and a timer duration based on a determination that the terminal has not left the cell, the timer duration being based on a value of the timer when the timer is stopped, and the determination being based on the first geographic location information and the second geographic location information.

In the terminal according to embodiments of the present disclosure, the processing circuitry may be configured to resume the cell service by determining second time-frequency position information of the terminal based on the first time-frequency position information and the timer duration, and resuming the cell service based on the second time-frequency position information.

In the terminal according to embodiments of the present disclosure, the processing circuitry may be configured to determine that the terminal has not left the cell based on a distance between a first geographic location and a second geographic location being less than or equal to a radius of the coverage area of the cell, the first geographic location being based on the first geographic location information, and the second geographic location being based on the second geographic location information.

In the terminal according to embodiments of the present disclosure, the terminal may include a first SIM card, and a second SIM card, wherein the processing circuitry is configured to cause the second SIM card to enter the offline state in response to the first SIM card entering a call state, acquire the first geographic location information and the first time-frequency position information in response to the first SIM card entering the call state, cause the second SIM card to exit the offline state in response to the first SIM card ending the call state, and resume the cell service of the second SIM card in response to the first SIM card ending the call state.

In the terminal according to embodiments of the present disclosure, the processing circuitry is configured to store synchronization information corresponding to the terminal entering the offline state, and resume the cell service by, receiving the synchronization information at a time-frequency position determined according to the second time-frequency position information, and resuming the cell service using the synchronization information.

In the terminal according to embodiments of the present disclosure, the synchronization information may include frequency-point information, time-slot synchronization information and system broadcast information of the cell.

According to embodiments of the present disclosure, an electronic apparatus may include at least one processor, and at least one memory storing computer executable instructions that, when executed by the at least one processor, cause the at least one processor to perform the method for resuming the cell service as described above.

According to embodiments disclosed, a non-transitory computer readable storage medium storing instructions that, when executed by at least one processor, cause the at least one processor to perform a method for resuming cell service, the method may include first acquiring first geographic location information of a terminal and first time-frequency position information of a cell corresponding to the terminal entering an offline state, the terminal being located in a coverage area of the cell when the terminal enters the offline state, and the cell service being suspended in the offline state, initiating a timer corresponding to the terminal entering the offline state, second acquiring second geographic location information of the terminal and stopping the timer corresponding to the terminal exiting the offline state, and resuming the cell service based on the first time-frequency position information and a timer duration based on a determination that the terminal has not left the cell, the timer duration being based on a value of the timer at the stopping, and the determination being based on the first geographic location information and the second geographic location information.

In the non-transitory computer-readable medium according to embodiments of the present disclosure, the resuming the cell service may include determining second time-frequency position information of the terminal based on the first time-frequency position information and the timer duration, and resuming the cell service based on the second time-frequency position information.

In the non-transitory computer-readable medium according to embodiments of the present disclosure, the determination may include determining that the terminal has not left the cell based on a distance between a first geographic location and a second geographic location being less than or equal to a radius of the coverage area of the cell, the first geographic location being based on the first geographic location information, and the second geographic location being based on the second geographic location information.

In the non-transitory computer-readable medium according to embodiments of the present disclosure, the terminal includes a first subscriber identification module (SIM) card and a second SIM card, the entering the offline state includes causing the second SIM card to enter the offline state in response to the first SIM card entering a call state, the first acquiring first acquires the first geographic location information and the first time-frequency position information in response to the first SIM card entering the call state, the exiting the offline state includes causing the second SIM card to exit the offline state in response to the first SIM card ending the call state, and the resuming the cell service resumes the cell service in response to the first SIM card ending the call state.

In the non-transitory computer-readable medium according to embodiments of the present disclosure, the method may further include storing synchronization information corresponding to the terminal entering the offline state, wherein the resuming the cell service resumes the cell service by, receiving the synchronization information at a time-frequency position determined according to the second time-frequency position information, and resuming the cell service using the synchronization information.

In the non-transitory computer-readable medium according to embodiments of the present disclosure, the synchronization information includes frequency-point information, time-slot synchronization information and system broadcast information of the cell.

In the non-transitory computer-readable medium according to embodiments of the present disclosure, the method may further include generating a communication signal, and transmitting the communication signal via the cell service after the resuming the cell service.

According to the following detailed description of embodiments of the present disclosure disclosed in combination with the accompanying drawings, other aspects, advantages and salient features of the present disclosure will become apparent to those skilled in the art.

The method and terminal for resuming the cell service according to embodiments of the present disclosure may retain advantages of reducing time consumption and/or energy consumption when the network is idle, and solve a disadvantage of excessive power consumption from searching the network when a mobile terminal resumes the cell service in a static mode, and the method and terminal of the present disclosure may also resume the current cell service more rapidly, and reduce the time delay Y.

In addition, various features and advantages understood directly or indirectly through the present disclosure may be provided

BRIEF DESCRIPTION OF THE DRAWINGS

The above and other aspects, features and advantages of embodiments disclosed herein will be more apparent through the following description in combination with the accompanying drawings, in which:

FIG. 2 shows values of the time delay Y when resuming cell service;

FIG. 5 is a diagram showing time-frequency position information according to embodiments in the present disclosure;

FIG. 8 is a diagram showing processing for different states of a timer TimerX according to embodiments in the present disclosure; and FIG. 9 is a diagram showing a terminal capable of resuming cell service according to embodiments in the present disclosure.

DETAILED DESCRIPTION

Hereinafter, embodiments of the present disclosure may be described with reference to the accompanying drawings.

Embodiments and terms used with respect to embodiments are not intended to limit the techniques described herein to specific examples, and should be understood to include various modifications, equivalents and/or alternatives to the examples. As used herein, each of descriptions such as "A or B", "at least one of A or B", "at least one of A and B", "A, B or C", "at least one of A, B and C" and "at least one of A, B or C" may include all possible combinations of items listed together with the corresponding one of the plurality of descriptions. As used herein, terms such as "first" and "second" may be used to simply distinguish the corresponding item from another item, and do not limit the item in other aspects (e.g., importance or order).

A method for resuming cell service based on embodiments in the present disclosure is described below with reference to FIGS. 3 to 8.

Figure 1:
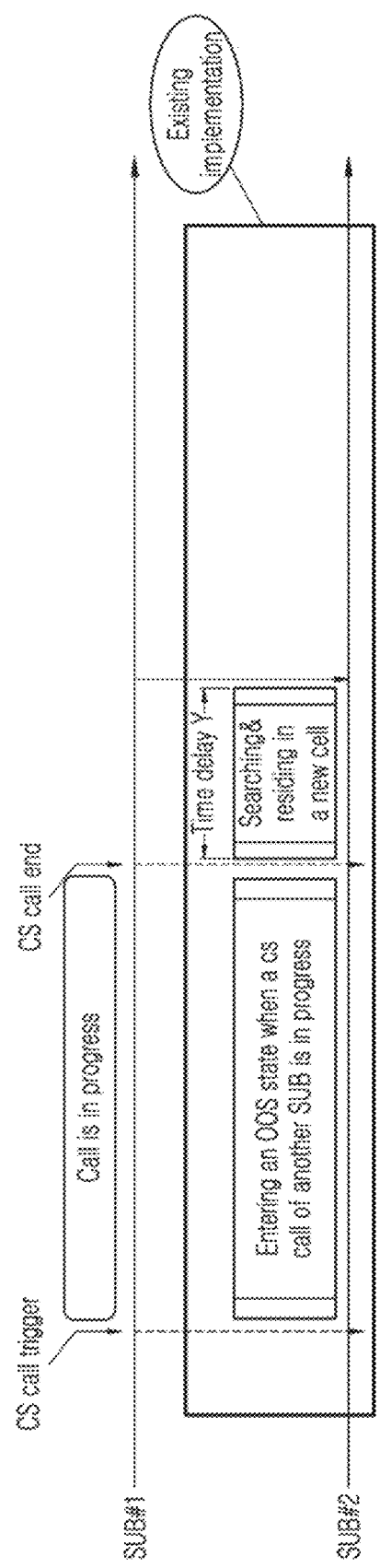
FIG. 1 is a diagram showing a process of suspending and resuming cell service by a SUB #2 of a mobile terminal with a DSDS mode.
Figure 3:
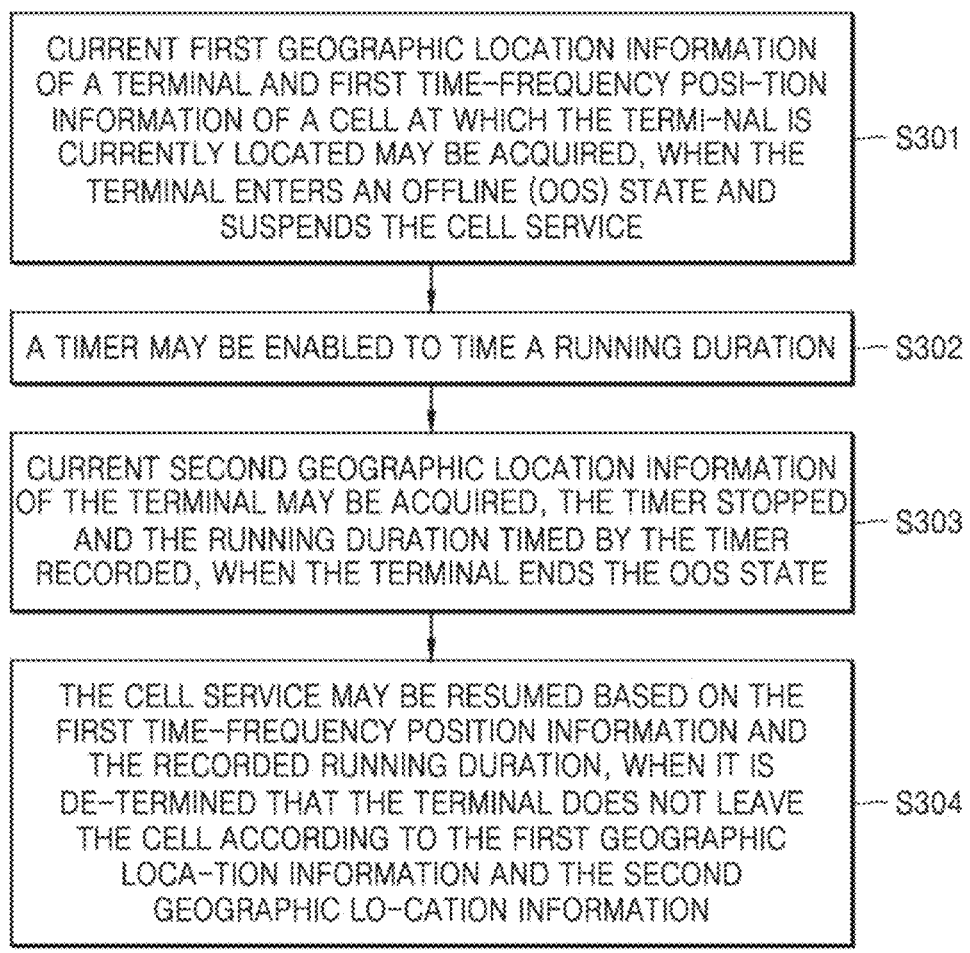
FIG. 3 is a diagram showing a method for resuming cell service according to embodiments in the present disclosure.
Figure 4:
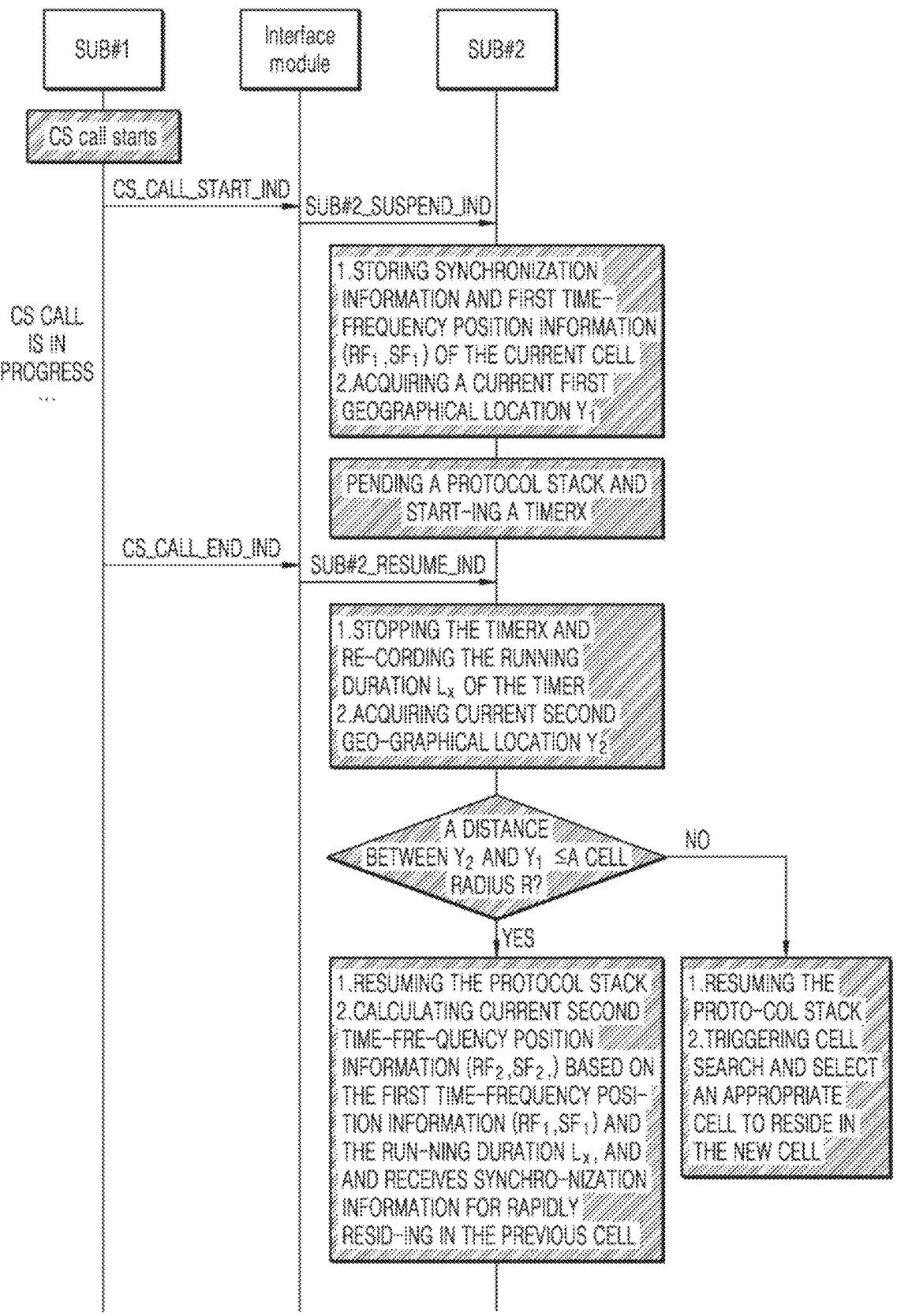
FIG. 4 is a diagram showing a process of suspending and resuming cell service by a second SIM card (SUB #2) of a mobile terminal with a DSDS mode according to embodiments in the present disclosure.

FIG. 3 is a diagram showing a method for resuming cell service according to embodiments in the present disclosure. FIG. 4 is a diagram showing a process of suspending and resuming cell service by a second SIM card (SUB #2) of a mobile terminal with a DSDS mode according to embodiments in the present disclosure. In the following, the diagram of the method for resuming the cell service in FIG. 3 will be described in detail taking the mobile terminal with the DSDS mode in FIG. 4 as an example.

According to FIG. 3, in the method for resuming the cell service according to embodiments includes, in operation S301, current first geographic location information of a terminal and a first time-frequency position information of a cell at (or in) which the terminal is currently located may be acquired when the terminal enters an offline (e.g., out of service) (OOS) state and suspends a cell service. According to embodiments, the current first geographic location information of the terminal may correspond to (e.g., may indicate, be used to obtain, etc.) the geographic location of the terminal at the time of the acquisition of the information (e.g., current first geographic location information). According to embodiments, the first time-frequency position information of the cell may include a first radio frame number $RF_1$ and a first sub frame number $SF_1$ at the time of the acquisition of the information (e.g., first time-frequency position information). According to embodiments, the cell may refer to a base station to which the terminal connects to receive the cell service. According to embodiments, the terminal may be described as being currently located at (or in) the cell when the terminal is within the coverage area of (and/or connected to) the base station. In operation S302, a timer may be enabled to time a running duration. According to embodiments, the timer may be enabled by initializing a value of the timer to zero and starting the timer such that the timer periodically increments (e.g., by seconds). According to embodiments, the first geographic location information may be acquired through at least one of the Global Navigation Satellite System (GNSS), Observable Time Difference of Arrival (OTDOA), Long Term Evolution Technology Positioning Protocol (LPP), and/or Secure User Plane Location (SUPL).

According to embodiments, the base station may generally refer to a fixed station that communicates with terminals and/or other base stations, and may exchange data and control information by communicating with terminals and/or other base stations. For example, the base station may also be referred to as a Node B, an evolved-Node B (eNB), a next generation Node B (gNB), a sector, a site, a base transceiver system (BTS), an access point (AP), a relay node, a remote radio head (RRH), a radio unit (RU), a cell, etc. In the present specification, a base station or a cell may be interpreted in a comprehensive sense to indicate some area or function covered by a base station controller (BSC) in CDMA, a Node-B in WCDMA, an eNB in LTE, a gNB or sector (site) in 5G, etc., and may cover all the various coverage areas such as megacell, macrocell, microcell, picocell, femtocell and relay node, RRH, RU, small cell communication range, etc.

The terminal may be fixed or mobile and may refer to any device that may communicate with a base station to transmit and receive data and/or control information. For example, the terminal may be referred to as a terminal, a terminal equipment, a mobile station (MS), a mobile terminal (MT), a user terminal (UT), a subscriber station (SS), a wireless device, a handheld device, etc.

A wireless communication network between the terminal and a base station may support communication between multiple users by sharing available network resources. For example, in the wireless communication network, information may be transmitted in various multiple access schemes, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), OFDM-FDMA, OFDM-TDMA, OFDM-CDMA, etc. The terminal may communicate with the base station through an uplink UL and a downlink DL.

According to embodiments, referring to FIG. 4, when a SUB #1 starts a CS call (e.g., a circuit switched call), the SUB #1 sends a CS_CALL_START_IND signal indicating that the SUB #1 starts (e.g., has started, is starting, will start shortly, etc.) the CS call to an interface module in the mobile terminal. In response to receiving the CS_CALL_START_IND signal, the interface module may send a SUB #2_SUSPEND_IND signal that instructs the SUB #2 to suspend the cell service, to the SUB #2. The SUB #2 may enter the OOS state in response to receiving the SUB #2_SUSPEND_IND signal. Then, the following process of suspending the cell service may be performed (e.g., by the SUB #2): storing synchronization information and first time-frequency position information ($RF_1$, $SF_1$) of the current cell, the synchronization information including frequency-point information, time-slot synchronization information and/or system broadcast information, acquiring and recording a current first geographical location $Y_1$ of the mobile terminal; pending a protocol stack (e.g., placing the protocol stack for the SUB #2 in a pending, or paused, state), and starting a timer TimerX to time the running duration.

Referring to FIG. 3, in operation S303, current second geographic location information of the terminal may be acquired, the timer may be stopped and the running duration timed by the timer may be recorded, when the terminal ends (e.g., exits) the OOS state. According to embodiments, the current second geographic location information of the terminal may correspond to (e.g., may indicate, be used to obtain, etc.) the geographic location of the terminal at the time of the acquisition of the information (e.g., current second geographic location information). According to embodiments, the timer is stopped such that a duration is measured, the duration corresponding to (e.g., equal or similar to) the amount of time the terminal spends in the OOS state. According to embodiments, the second geographic location information may be acquired through at least one of the Global Navigation Satellite System (GNSS), Observable Time Difference of Arrival (OTDOA), Long Term Evolution Technology Positioning Protocol (LPP) and/or Secure User Plane Location (SUPL).

According to embodiments, referring to FIG. 4, when the SUB #1 ends the CS call, the SUB #1 may send a CS_CALL_END_IND signal indicating that the SUB #1 ends (has ended, is ending, will end shortly, etc.) the CS call to the interface module. The interface module may send a SUB #2_signal that instructs the SUB #2 to resume the cell service, to SUB #2 in response to receiving the CS_CALL_END_IND signal. The SUB #2 may end the OOS state in response to receiving the SUB #2_RESUME_IND signal. Then the following processing of resuming the cell service may be performed (e.g., by the SUB #2): stopping the timer TimerX and recording the running duration $L_x$ timed by the timer TimerX, and acquiring and recording a current second geographical location $Y_2$ of the mobile terminal.

Returning to refer to FIG. 3, in operation S304, the cell service may be resumed based on the first time-frequency position information and the recorded running duration, when it is determined that the terminal does not leave the cell (e.g., has not left the cell) according to the first geographic location information and the second geographic location information.

According to embodiments, determining that the terminal does not leave the cell according to the first geographic location information and the second geographic location information may comprise: determining that the terminal does not leave the cell, when a distance, between a first geographic location determined according to the first geographic location information and a second geographic location determined according to the second geographic location information, is less than or equal to a threshold (e.g., a cell radius of the cell, and/or a radius of the coverage area of the cell, at which the terminal is located when the terminal enters the OOS state, and/or at the time of acquisition of the first geographic location information and/or the first time-frequency position information). According to embodiments, resuming the cell service based on the first time-frequency position information and the recorded running duration may comprise: determining the current second time-frequency position information of the terminal based on the first time-frequency position information and the recorded running duration; and resuming the cell service by using the determined second time-frequency position information. According to embodiments, the cell service may be resumed after suspension of the cell services without performing a cell search in situations in which the terminal has not traveled a distance greater than the threshold (e.g., has not moved to a different cell during the suspension). According to embodiments, after resuming the cell service, the terminal may generate a communication signal (e.g., a paging signal, a paging response, an Internet Protocol (IP) packet, a voice call, a video call, a short message service (SMS) message, etc.) and transmit the communication signal via the cell service.

The method for resuming the cell service according to embodiments may further include saving synchronization information for resuming the cell service when the terminal enters the OOS state. Resuming the cell service by using the determined second time-frequency position information may comprise: receiving the synchronization information at a time-frequency position determined according to the second time-frequency position information, and resuming the cell service by using the synchronization information. The synchronization information may include frequency-point information, time-slot synchronization information and/or system broadcast information of the cell.

Referring to the example illustrated in FIG. 4, when a distance between the second geographic location $Y_2$ and the first geographical location $Y_1$ is less than or equal to a threshold (e.g., a cell radius R of the cell when the SUB #2 enters the OOS state), the SUB #2 may resume the protocol stack, calculate current second time-frequency position information ($RF_2$, $SF_2$) based on the first time-frequency position information ($RF_1$, $SF_1$) and the running duration $L_x$, and receive synchronization information based on the second time-frequency position information ($RF_2$, $SF_2$), thereby rapidly residing in (e.g., reconnecting to) the previous cell and resuming the cell service.

Figure 5:
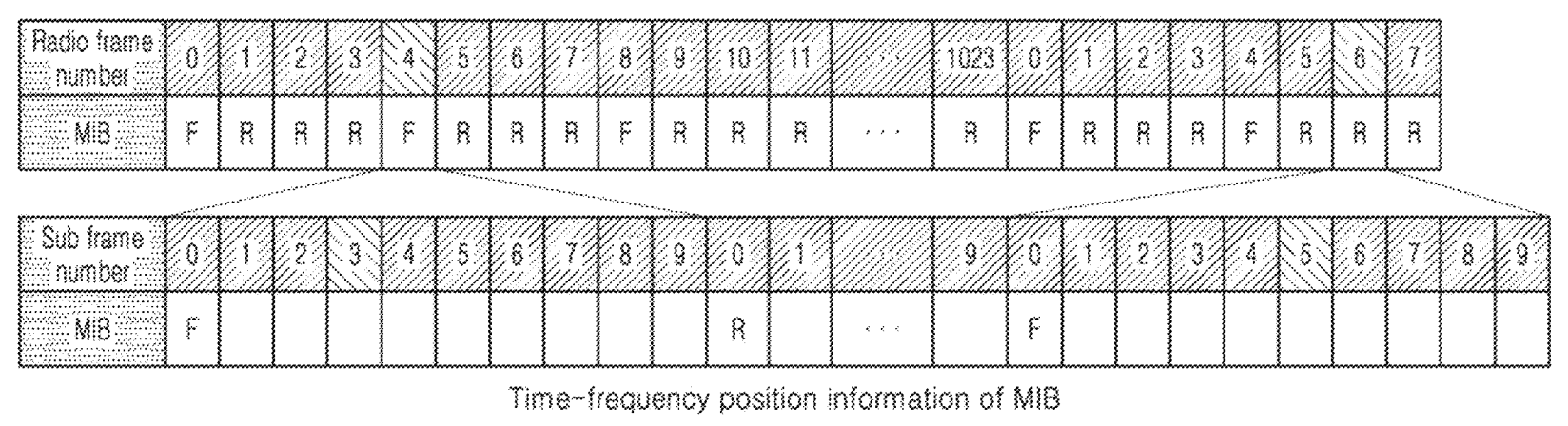

The process of determining the second time-frequency position information will be described in detail by referring to FIG. 5 in which system information of a RAT Frequency Division Duplex Long Term Evolution (FDD LTE) cell is discussed as an example. According to embodiments, system information corresponding to cells of different RATs may also be used. FIG. 5 is a diagram showing time-frequency position information according to embodiments in the present disclosure.

According to embodiments disclosed herein, when the terminal or the SUB #2 of the terminal enters the OOS state, in addition to acquiring the current first geographic location information of the terminal, the first time-frequency position information ($RF_1$, $SF_1$) of the cell at which the terminal is currently located may also be acquired. When the OOS state ends, the running duration $L_x$ of the timer may be recorded. Since the time-frequency position at which the system information is received in the same cell (or similar cells) is invariant according to a pre-determined or alternatively, given rule, the second time-frequency position information ($RF_2$, $SF_2$) for receiving the synchronization information may be calculated based on the first time-frequency position information ($RF_1$, $SF_1$) and the running duration $L_x$ through a preset or alternatively, given formula, for example, the second time-frequency position information ($RF_2$, $SF_2$) may be calculated by the following formula:

$$RF_2 = ((L_x + SF_1)/10 + RF_1)\% 1024$$

$$SF_2 = (L_x + SF_1)\% 10$$

Wherein $RF_1$ represents a radio frame number of the first time-frequency position information ($RF_1$, $SF_1$), $SF_1$ represents a sub frame number of the first time-frequency position information ($RF_1$, $SF_1$), $RF_2$ represents a radio frame number of the second time-frequency position information ($RF_2$, $SF_2$), and $SF_2$ represents a sub frame number of the second time-frequency position information ($RF_2$, $SF_2$).

Referring to FIG. 5, in the system information (e.g., the master information block) MIB, it is assumed that the radio frame number $RF_1$ of the first time-frequency position information ($RF_1$, $SF_1$) is 4, the sub frame number $SF_1$ of the first time-frequency position information ($RF_1$, $SF_1$) is 3, and the running duration $L_x$ recorded by the timer TimerX is 12262 ms, then the $RF_2$ and $SF_2$ of the second time-frequency position information ($RF_2$, $SF_2$) may be calculated to be 6 and 5 according to the above formula, respectively. According to embodiments, the MIB may be transmitted (e.g., broadcasted periodically) by the base station in the cell, received by the terminal and/or stored in a memory of the terminal. Synchronization information including frequency-point information, time-slot synchronization information and/or system broadcast information of the cell may be received at the time-frequency position indicated by the second time-frequency position information.

The method shown in FIG. 5 may resume the cell service based on the first time-frequency position information and the recorded running duration. The processing of synchronization information will be described in detail with reference to FIG. 6 below.

Figure 6:
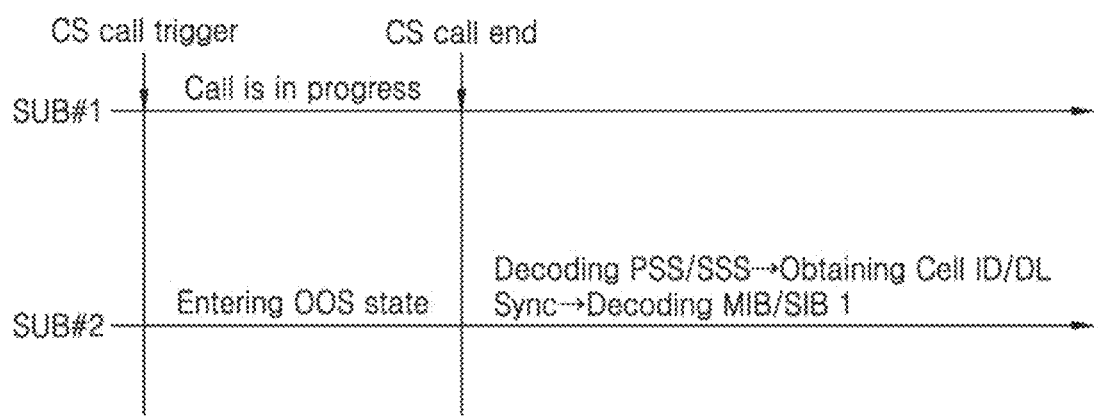
FIG. 6 is a diagram showing a processing for synchronization information by a second SIM card (SUB #2) of a mobile terminal with a DSDS mode according to embodiments in the present disclosure.

FIG. 6 is a diagram showing a processing for synchronization information by a second SIM card (SUB #2) of a mobile terminal with a DSDS mode according to embodiments in the present disclosure. Referring to FIG. 6, the SUB #2 may be in an OOS state during a call on a SUB #1, and when the SUB #1 ends the call, a cell ID/downlink synchronization (DL sync) signal may be obtained by decoding a primary synchronization signal (PSS) and/or secondary synchronization signal (SSS), so as to decode a MIB and/or system information block (SIB) to rapidly resume the cell service.

Figure 7:
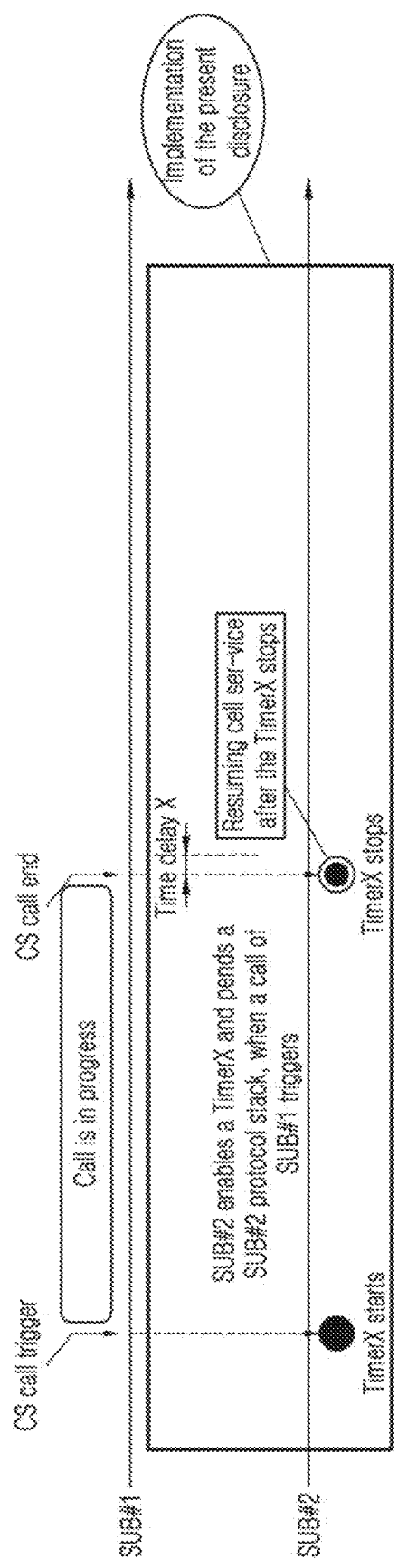
FIG. 7 is a diagram showing a process of suspending and resuming cell service by a second SIM card (SUB #2) of a mobile terminal with a DSDS mode according to embodiments in the present disclosure.

FIG. 7 is a diagram showing a process of suspending and resuming cell service by a second SIM card (SUB #2) of a mobile terminal with a DSDS mode according to embodiments in the present disclosure.

According to FIG. 7, when a first SIM card (SUB #1) of the terminal starts to call, timer TimerX may be enabled and a SUB #2 protocol stack may be pended; and when the SUB #1 ends the call, timer TimerX may be stopped, the SUB #2 protocol stack may be resumed, and a process of resuming the cell service may be performed. Compared with a time delay (for example, the time delay Y in FIG. 2) and power consumption for resuming the cell service without performing the operations discussed in association with e.g., FIGS. 3-4, a time delay X of resuming the cell service of embodiments in the present disclosure may be smaller and resuming the cell service of embodiments in the present disclosure consumes less power.

Returning to FIG. 4, according to embodiments, when it is determined that the terminal has left the cell according to the first geographic location information and the second geographic location information, a cell search may be performed and a new cell in which to be resided (e.g., connected to, camped on, etc.) may be selected, and the cell service may be acquired from the new cell. Referring to FIG. 4, when the distance between the second geographic location $Y_2$ and the first geographical location $Y_1$ is greater than the threshold (e.g., the cell radius R of the cell when the SUB #2 enters the OOS state), the SUB #2 may resume the protocol stack and trigger a cell search process to select the appropriate new cell in which to reside (e.g., connect to, camp on, etc.).

According to embodiments, the terminal may be a terminal that uses the first SIM card and the second SIM card to acquire the cell service (for example, a mobile terminal with a DSDS mode), wherein in response to the first SIM card of the terminal entering the call state, the second SIM card of the terminal may enter the OOS state, and acquire the first geographic location information and the first time-frequency position information. In response to the first SIM card of the terminal ending the call state, the second SIM of the terminal may end the OOS state and resume the cell service of the second SIM card. According to embodiments, the terminal is configured to resume the cell service after suspension of the cell services without performing a cell search in situations in which the terminal has not traveled a distance greater than the threshold (e.g., has not moved to a different cell during the suspension). According to embodiments, after resuming the cell service of the second SIM card, the terminal may generate a communication signal (e.g., a paging signal, a paging response, an Internet Protocol (IP) packet, a voice call, a video call, a short message service (SMS) message, etc.) and cause the second SIM card to transmit the communication signal via the cell service.

Definitions for different states of the timer TimerX based on embodiments in the present disclosure are described below with reference to FIG. 8. FIG. 8 is a diagram showing processing for different states of a timer TimerX according to embodiments in the present disclosure.

Referring to FIG. 8, according to embodiments, when the timer TimerX is started, timing of a running duration of timer TimerX is started. For example, as shown in FIG. 4, when the call of the SUB #1 of the mobile terminal with the DSDS mode starts, the SUB #2 may enter the OOS state, the timer TimerX may be started and the current first geographic location information of the mobile terminal may be recorded.

When timer TimerX is stopped, the timing ends and the running duration of the timer TimerX may be recorded to resume the cell service. For example, as shown in FIG. 4, when the SUB #1 ends the call and the timer TimerX is running, the timer TimerX may be stopped, the running duration of the timer TimerX may be recorded, and the current second geographic location information of the mobile terminal may be recorded.

In addition, a duration of the timer TimerX may be set to an infinite length so that timer TimerX is always in an un-expired state. For example, according to embodiments, the timer TimerX may not have a stop or end time.

FIG. 9 is a diagram showing a terminal capable of resuming cell service according to embodiments in the present disclosure.

Referring to FIG. 9, the terminal 900 capable of resuming cell service according to embodiments may comprise a timer 901, an acquisition unit 902 and/or a processing unit 903.

Specifically, the acquisition unit 902 according to embodiments may be configured to: when the terminal 900 enters an offline (OOS) state and suspends the cell service, acquire current first geographic location information of the terminal 900 and a first time-frequency position information of a cell at which the terminal 900 is currently located (e.g., to which the terminal 900 is currently connected corresponding to the cell service), and/or enable a timer 901 to time a running duration. When the terminal 900 ends the OOS state, the acquisition unit 902 may be configured to acquire current second geographic location information of the terminal 900, stop the timer 901 and/or record the running duration timed by the timer 901.

Specifically, the processing unit 903 according to embodiments may be configured to: resume the cell service based on the first time-frequency position information and the recorded running duration, when it is determined that the terminal 900 does not leave the cell according to the first geographic location information and the second geographic location information.

Specifically, the processing unit 903 may resume the cell service based on the first time-frequency position information and the recorded running duration by the operations of: determining the current second time-frequency position information of the terminal 900 based on the first time-frequency position information and the recorded running duration; and resuming the cell service by using the determined second time-frequency position information.

The processing unit may determine that the terminal does not leave the cell, when a distance, between a first geographic location determined according to the first geographic location information and a second geographic location determined according to the second geographic location information, is less than or equal to a threshold (e.g., a cell radius of the cell at which the terminal is located when the terminal enters the OOS state).

The terminal 900 may be a terminal that uses a first SIM card and a second SIM card to acquire the cell service, wherein, in response to the first SIM card of the terminal 900 entering a call state, the processing unit 903 may cause the second SIM card of the terminal 900 to enter the OOS state, and the acquisition unit 902 may acquire the first geographic location information and the first time-frequency position information. In response to the first SIM card of the terminal 900 ending the call state, the processing unit 903 may cause the second SIM of the terminal 900 to end the OOS state, and the processing unit 903 may resume the cell service of the second SIM card. According to embodiments, after resuming the cell service, the processing unit 903 may generate a communication signal (e.g., a paging signal, a paging response, an Internet Protocol (IP) packet, a voice call, a video call, a short message service (SMS) message, etc.) and cause the second SIM card to transmit the communication signal via the cell service.

The processing unit 903 may save synchronization information for resuming the cell service when the terminal 900 enters the OOS state, wherein the processing unit 903 may resume the cell service by using the determined second time-frequency position information by the operations of: receiving the synchronization information at a time-frequency position determined according to the second time-frequency position information, and resuming the cell service by using the synchronization information. The synchronization information may include frequency-point information, time-slot synchronization information and/or system broadcast information of the cell.

The acquisition unit 902 may acquire the first geographic location information or the second geographic location information through at least one of the Global Navigation Satellite System (GNSS), Observable Time Difference of Arrival (OTDOA), Long Term Evolution Technology Positioning Protocol (LPP), and/or Secure User Plane Location (SUPL).

The processing unit 903 may also be configured to: when it is determined that the distance between the first geographic location information and the second geographic location information is greater than the threshold (e.g., the terminal has left the cell according to the first geographic location information and the second geographic location), perform a cell search and select a new cell in which to be resided (e.g., connected to, camped on, etc.), and acquire cell service from the new cell.

In addition, features and benefits that are understood directly or indirectly through exposure may be provided.

Conventional mobile terminals perform a first cell search process to establish a cell service (e.g., a connection to a cellular communication network) and a second cell search process to resume the cell service after suspension of the cell service. This second cell search process is always performed by the conventional mobile terminals, even in situations in which the mobile terminal has not moved to a different cell during the suspension. Especially in these situations, the second cell search process results in excessive delay in resuming the cell service, consumes excessive resources (e.g., power, processor, memory, bandwidth, etc.), and/or reduces the quality of service (QoS) of the cell service.

However, according to embodiments, improved mobile terminals are provided. For example, the improved mobile terminals obtain information that may be used to resume the cell service after suspension of the cell service, without performing the second cell search process, in situations in which the mobile terminal remains in the same cell (or a similar cell) during the suspension. Specifically, the improved mobile terminals may obtain time-frequency position information at the time of entering the suspension, and the duration of the suspension, and use this information to resume the cell service without performing the second cell search process. Accordingly, the improved mobile terminals overcome the deficiencies of the conventional mobile terminals to at least reduce delay and resource consumption (e.g., power, processor, memory, bandwidth, etc.), and/or improve the QoS of the cell service.

According to embodiments, operations described herein as being performed by the first SIM card, the second SIM card, the interface module, the terminal 900, the timer 901, the acquisition unit 902 and/or the processing unit 903 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Embodiments of the present disclosure may be implemented in hardware, firmware, or by executing software or computer code that may be stored in recording medium (e.g., a non-transitory computer readable recording medium) such as a CD ROM, a digital universal disk (DVD), a magnetic tape, a RAM, a floppy disk, a hard disk, and/or a magnetic disc, and/or by executing computer codes downloaded via the network, which are originally stored on remote recording medium or non-temporary machine-readable medium and will be stored on local recording medium, so that the methods described herein may be presented via such software stored on a recording medium using a general-purpose computer or a special-purpose processor or stored in programmable or special-purpose hardware such as ASIC or FPGA. As will be understood in the art, a computer, a processor, a microprocessor controller and/or a programmable hardware includes a memory component (e.g., a RAM, a ROM, a flash memory, etc.) that may store or receive software or computer codes, wherein the software or computer codes, when accessed and executed by a computer, a processor and/or a hardware, implement the processing methods described herein.

Although the present disclosure has been illustrated and described with reference to embodiments of the disclosure, those skilled in the art will understand that various changes in form and detail may be made therein, without departing from the spirit and scope of the disclosure defined by the appended claims and their equivalents.

What is claimed is:

1. A method for resuming cell service, comprising:
   first acquiring first geographic location information of a terminal and first time-frequency position information of a cell at a first timing at which the terminal enters an offline state, the terminal being located in a coverage area of the cell at the first timing, and the cell service being suspended in the offline state;
   initiating a timer at the first timing;
   second acquiring second geographic location information of the terminal and stopping the timer at a second timing at which the terminal exits the offline state; and
   resuming the cell service based on the first time-frequency position information and a first duration in response to a determination that the terminal has not left the cell, the first duration being a duration between the first timing and the second timing, and the determination being based on the first geographic location information and the second geographic location information.

2. The method of claim 1, wherein the resuming the cell service comprises:
   calculating second time-frequency position information of the terminal based on the first time-frequency position information and the first duration; and
   resuming the cell service based on the second time-frequency position information.

3. The method of claim 2, wherein
   the terminal includes a first subscriber identification module (SIM) card and a second SIM card;
   entry, by the terminal, into the offline state includes causing the second SIM card to enter the offline state in response to the first SIM card entering a call state;
   the first acquiring first acquires the first geographic location information and the first time-frequency position information in response to the first SIM card entering the call state;
   exit, by the terminal, from the offline state includes causing the second SIM card to exit the offline state in response to the first SIM card ending the call state; and
   the resuming the cell service resumes the cell service in response to the first SIM card ending the call state.

4. The method of claim 2, further comprising:
   storing synchronization information corresponding to the terminal entering the offline state,
   wherein the resuming the cell service resumes the cell service by,
      receiving the synchronization information at a time-frequency position determined according to the second time-frequency position information, and
      resuming the cell service using the synchronization information.

5. The method of claim 4, wherein the synchronization information includes frequency-point information, time-slot synchronization information and system broadcast information of the cell.

6. The method of claim 1, wherein the determination comprises:
   determining that the terminal has not left the cell based on a distance between a first geographic location and a second geographic location being less than or equal to a radius of the coverage area of the cell, the first geographic location being based on the first geographic location information, and the second geographic location being based on the second geographic location information.

7. An electronic apparatus, comprising:
at least one processor; and
at least one memory storing computer executable instructions that, when executed by the at least one processor, cause the at least one processor to perform the method for resuming the cell service of claim 1.

8. The method of claim 1, further comprising:
generating a communication signal; and
transmitting the communication signal via the cell service after the resuming the cell service.

9. A terminal capable of resuming cell service, comprising:
processing circuitry configured to,
acquire first geographic location information of the terminal and first time-frequency position information of a cell at a first timing at which the terminal enters an offline state, the terminal being located in a coverage area of the cell at the first timing, and the cell service being suspended in the offline state,
initiating a timer at the first timing,
acquire second geographic location information of the terminal and stop the timer at a second timing at which the terminal exits the offline state, and
resume the cell service based on the first time-frequency position information and a first duration in response to a determination that the terminal has not left the cell, the first duration being a duration between the first timing and the second timing, and the determination being based on the first geographic location information and the second geographic location information.

10. The terminal of claim 9, wherein the processing circuitry is configured to resume the cell service by:
calculating second time-frequency position information of the terminal based on the first time-frequency position information and the first duration; and
resuming the cell service based on the second time-frequency position information.

11. The terminal of claim 10, further comprising:
a first SIM card; and
a second SIM card,
wherein the processing circuitry is configured to,
cause the second SIM card to enter the offline state in response to the first SIM card entering a call state,
acquire the first geographic location information and the first time-frequency position information in response to the first SIM card entering the call state,
cause the second SIM card to exit the offline state in response to the first SIM card ending the call state, and
resume the cell service of the second SIM card in response to the first SIM card ending the call state.

12. The terminal of claim 10, wherein the processing circuitry is configured to:
store synchronization information corresponding to the terminal entering the offline state; and
resume the cell service by,
receiving the synchronization information at a time-frequency position determined according to the second time-frequency position information, and
resuming the cell service using the synchronization information.

13. The terminal of claim 12, wherein the synchronization information includes frequency-point information, time-slot synchronization information and system broadcast information of the cell.

14. The terminal of claim 9, wherein the processing circuitry is configured to determine that the terminal has not left the cell based on a distance between a first geographic location and a second geographic location being less than or equal to a radius of the coverage area of the cell, the first geographic location being based on the first geographic location information, and the second geographic location being based on the second geographic location information.

15. A non-transitory computer readable storage medium storing instructions that, when executed by at least one processor, cause the at least one processor to perform a method for resuming cell service, the method comprising:
first acquiring first geographic location information of a terminal and first time-frequency position information of a cell at a first timing at which the terminal enters an offline state, the terminal being located in a coverage area of the cell at the first timing, and the cell service being suspended in the offline state;
initiating a timer at the first timing;
second acquiring second geographic location information of the terminal and stopping the timer at a second timing at which the terminal exits the offline state; and
resuming the cell service based on the first time-frequency position information and a first duration in response to a determination that the terminal has not left the cell, the first duration being a duration between the first timing and the second timing, and the determination being based on the first geographic location information and the second geographic location information.

16. The non-transitory computer readable storage medium of claim 15, wherein the resuming the cell service comprises:
calculating second time-frequency position information of the terminal based on the first time-frequency position information and the first duration; and
resuming the cell service based on the second time-frequency position information.

17. The non-transitory computer readable storage medium of claim 16, wherein
the terminal includes a first subscriber identification module (SIM) card and a second SIM card;
entry, by the terminal, into the offline state includes causing the second SIM card to enter the offline state in response to the first SIM card entering a call state;
the first acquiring first acquires the first geographic location information and the first time-frequency position information in response to the first SIM card entering the call state;
exit, by the terminal, from the offline state includes causing the second SIM card to exit the offline state in response to the first SIM card ending the call state; and
the resuming the cell service resumes the cell service in response to the first SIM card ending the call state.

18. The non-transitory computer readable storage medium of claim 16, wherein the method further comprises:
storing synchronization information corresponding to the terminal entering the offline state,
wherein the resuming the cell service resumes the cell service by,
receiving the synchronization information at a time-frequency position determined according to the second time-frequency position information, and
resuming the cell service using the synchronization information.

19. The non-transitory computer readable storage medium of claim 18, wherein the synchronization information includes frequency-point information, time-slot synchronization information and system broadcast information of the cell.

20. The non-transitory computer readable storage medium of claim 15, wherein the determination comprises:
   determining that the terminal has not left the cell based on a distance between a first geographic location and a second geographic location being less than or equal to a radius of the coverage area of the cell, the first geographic location being based on the first geographic location information, and the second geographic location being based on the second geographic location information.

\* \* \* \* \*